May 14, 1940.  H. L. RUSHING  2,201,100
COMB FRAME FOR BEEHIVES
Filed April 6, 1937  2 Sheets-Sheet 1
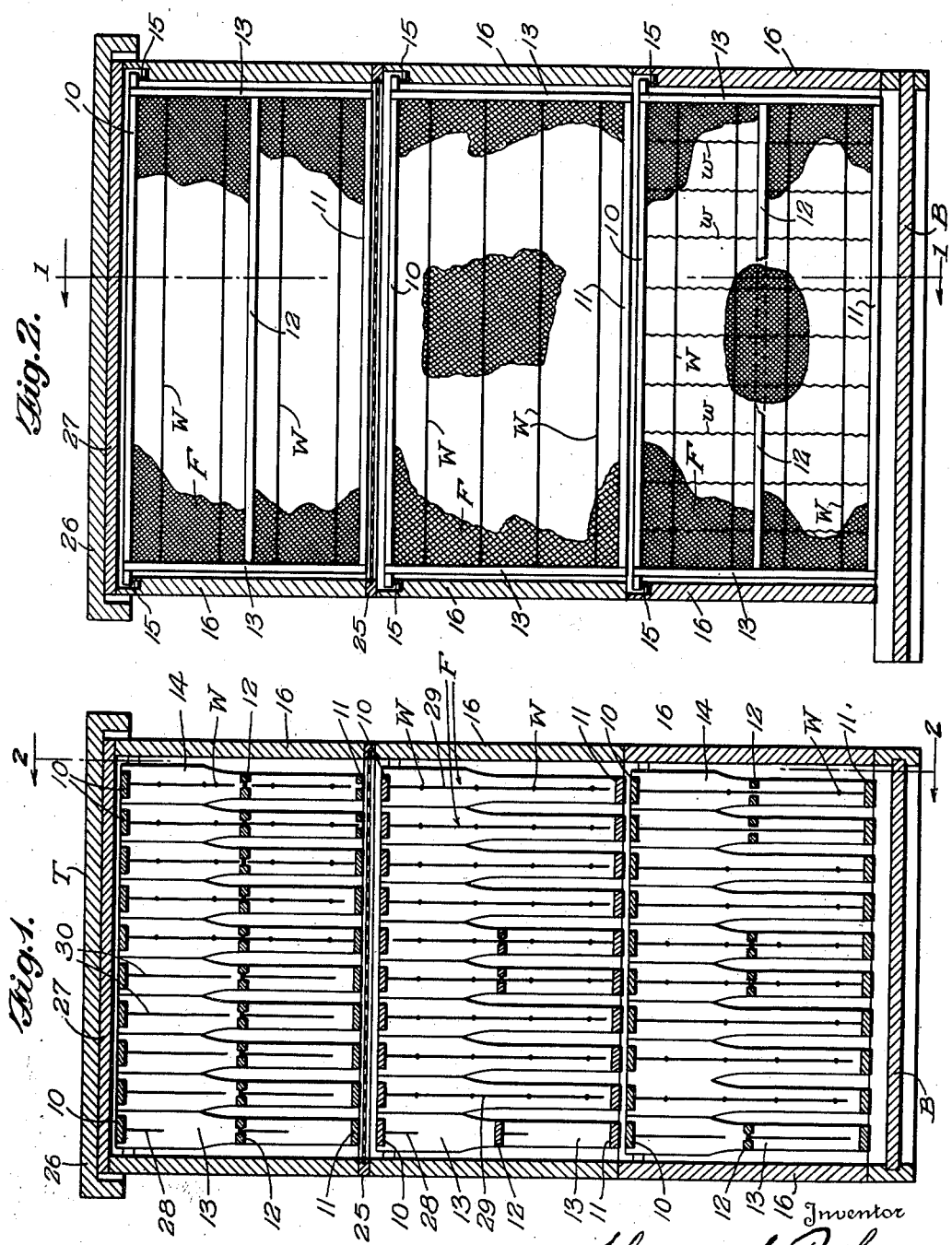

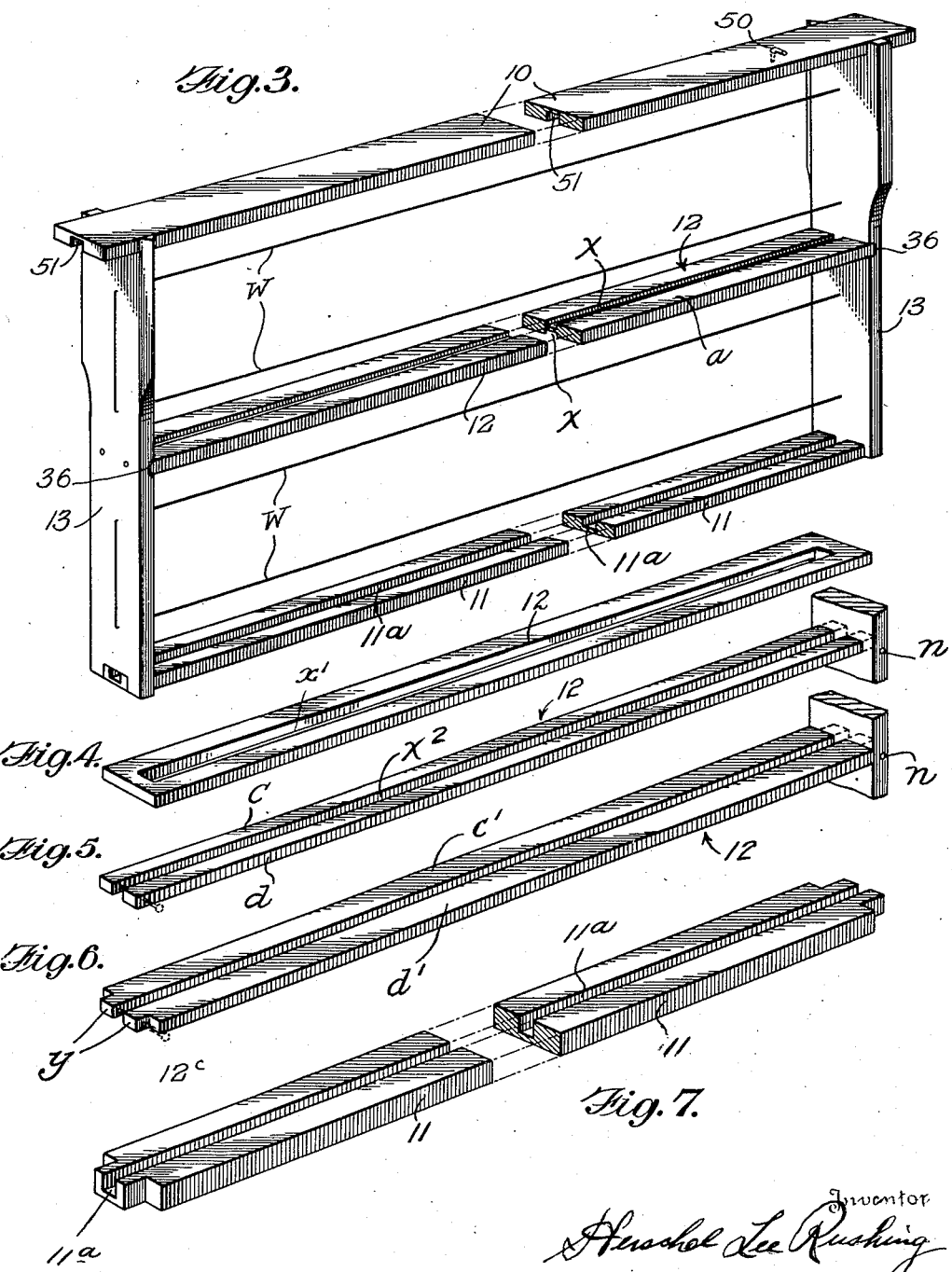

Patented May 14, 1940

2,201,100

UNITED STATES PATENT OFFICE 2,201,100

COMB FRAME FOR BEEHIVES

Herschel Lee Rushing, Nashville, Tenn.

Application April 6, 1937, Serial No. 135,320

4 Claims. (Cl. 6—10)

An important object is to promote the production of comb honey, a hive embodying and manipulated in accordance with my invention is capable of satisfactorily producing comb honey; and that is done without the employment of the present conventional shallow super and the customary equipment for producing comb honey, but by using the substitutes therefor hereafter described, which give to the hive capacities for manipulations or handling as above-mentioned and secure other advantages that will hereinafter set forth.

Put in general terms, a hive embodying my invention has a plurality of tiered up bodies that provide brood and food and surplus honey chambers that are of uniform size, making it a matter of indifference which is below and which is above, and frames likewise of uniform size installed in each of the bodies, and of the size and general form of the customary brood or extractor frames, so that the frames are interchangeably usable in the bodies of uniform size and form. For the production of comb honey, the frames have the special construction about to be explained, but that does not prevent their transfer to the brood chamber when occasion therefor arises, nor their use alongside of the ordinary frames provided for brood rearing or for extracted honey, which lack the special construction referred to for comb honey production in the super body.

That special construction is an arrangement of one or more horizontal bars extending between the frame end bars, which divide the space between top and bottom bars into two or more vertically limited areas for comb honey production therein.

My invention consists in whatever is described by or is included within the terms or scope of the appended claims and is exemplified, in what I now regard as satisfactory embodiments, by what is shown in the accompanying drawings. In such drawings:

Fig. 1 is a vertical transverse section of a three story hive embodying my invention;

Fig. 2 is a vertical section thereof from front to back;

Fig. 3 is a perspective view of one of my frames having a horizontal center bar that provides two comb-honey receiving areas of like size;

Figs. 4, 5, and 6 are respectively, perspective views of horizontal division bars differing from that shown in Fig. 3; and Fig. 7 is an enlarged perspective view of the bottom bar of the comb frame.

I will now describe with some particularity or detail the structures shown in the drawings:

Since it is a desirable feature of my invention to have all frames of the hive,—those in brood chambers as well as those in supers,—of the same size and type, my frames are of the large type usually classed as brood frames. To fit these large frames for the production of edible comb honey the comb of which must be edible along with the honey, I divide the deep space between top bar 10 and bottom bar 11 of the frame, as by a centrally placed horizontal division bar means 12 which provides limited areas for comb, one above the other and reaching from end bar 13 to end bar 13. Brood frames, if "Standard" frames are 9⅓x17⅝ inches, and if "Jumbo" are 11¼x17⅝ inches.

As is usual, the top bars of the frames are projected beyond the end bars to rest upon the usual ledges or shoulders 15 at the top of the hive body 16, for suspending the frames from the latter, side by side, and the end bars 13, as usual, are widened at the upper part for the edge to edge bearing contact between adjacent frames to provide bee spaces below.

As clearly shown in Figs. 1 and 2, the brood chamber and super bodies 16 are of identical form and dimensions, and so are interchangeable. There are the usual bottom board B and top cover T.

Of course, it is not necessary that all the frames for the hive equipment shall have the subdividing horizontal bar, but only those intended for comb honey production. However, in carrying on the hive operations, frames may be transferred from super body to brood chamber, so that both kinds of frame may be in the brood chamber at the same time. This is shown clearly in Figs. 1 and 2. The possibility of such an interchange is a valuable characteristic of my invention. For example, because of a poor quality of honey stored in the combs, or insufficiently filled combs, or travel stains on the honey comb, transfer may be desirable of the frame containing it to the brood chamber for brood rearing.

The horizontal bar means 12 may have various forms, such as specifically shown in Figs. 1 to 6, and be attached or fastened to the frame end bars in various ways. These bars, whatever their form, serve to hold in place the very thin super comb foundation sheet F (Fig. 2) required for edible comb honey, and prevent warping, sagging, and stretching thereof, and loosening from the bar from which it is suspended. Thin foundation and foundation preferably free from wire reinforcement is obviously important for edible honey. If wires are used they must be taken from the honey comb before eating it.

The bar $a$ shown in Fig. 3 is formed with a centrally placed, longitudinally extending slot $x$ from end bar to end bar, through which a sheet of foundation, F may extend upwardly and downwardly toward the top bar 10 and bottom bar 11, respectively, or enter a longitudinal groove or slot therein, or reach only to said top and bottom bars, if, as may be the case, the latter is solid and has no slit or groove. The foundation edge may be fastened in any desired way. The slot $x$ may be provided in any suitable way, such, for instance, as shown in Figures 4, 5, and 6. The division bar means 12 as shown in Fig. 4 comprises a single bar $b$ having a longitudinal slot $x'$ therein through which a single sheet of foundation $f$ may extend. As shown in each of Figs. 5 and 6, the division bar means 12 may consist of two parallel strips $c$ and $d$ disposed in the same horizontal plane and spaced apart to provide the horizontal slot $x^2$. The division bar means shown in Fig. 6 is the same as shown in Fig. 5 except that the end of the strips $c'$ and $d'$ have their ends formed into tenons $v$ that fit mortises in the frame end bars 13, and may be secured by a nail $n$ at each end that passes horizontally through end bar and tenons, but the nails need not be used. The ends of the strips $c$ and $d$ of Fig. 5 may also be placed in mortises in the end bars 13 and similarly nailed, or if desired may abut against the inside faces of the end bars and be secured thereto by horizontal nails.

A sheet of foundation F may be attached between the strips $c$ and $d$ (Figs. 5 and 6), and placed to project upward or downward therefrom, or both upward and downward. One of such strips $c$ and $d$ may be applied to the end bars 13, and then a full size sheet of foundation inserted in the frame and finally the second bar applied to the end bars and the strips nailed to the latter. This full sheet may reach to, or a little short of the bottom bar of the frame, or it may extend into a slot 11a (Figs. 3 and 7) therein.

As shown in Figure 3 the division bar $a$ has its ends preferably seated in shallow horizontal grooves or gains 36 cut in the inner face of each end bar 13 to be in horizontal alignment. These grooves or gains 36 provide a means for quickly locating the position of the division bar and for giving additional support to the same when the frame is loaded with honey. Of course, the bars are further secured in place by nails driven through the end bars 13. When the bar $a$ (Figure 3) is composed of two sections or strips as in Figures 5 and 6 one section or strip may be applied in position to the end bars 13 and secured in place and the other bar may be left unsecured so as to be removable to enable the insertion of a foundation sheet, and then said other strip may be applied in place and nailed to the end bars as shown in the drawings.

Of course all division bar means 12, by supporting the bottom of the upper half of the comb in the brood frame, prevent loosening of comb from the top frame bar 10, under temperatures high enough to melt the wax. When power machines are used for uncapping, division bars 12 may serve to prevent sideway of comb in the frame, relative to the knife which if it occurs, results in very deep cut-off of the comb cells. Giving the division bar means 12 a width the same as the frame bottom bars 11 will save any hindrance by such bars to the use of an uncapping knife when it is desired to uncap the cells for centrifugal extraction of the honey.

The grooves 11a of the bottom bar 11 and the groove $x$ in the upper face in the division bar $a$ as shown in Fig. 3, are of a depth so that the foundation sheet may be applied, by first placing its bottom edge in such grooves while the top edge reaches to the bottom face of the next upper adjacent horizontal bar (which would be the bars 10 and $a$ in Fig. 3 and bar 10 if intermediate bars such as in Figs. 4, 5, and 6 are employed) and then by lifting the sheets its upper edge would enter the groove 51 in the top bar 10, or, as the case may be, the bottom groove $x$ in the bar $a$ of Fig. 3, where said upper edge may be fixed by any of the usual methods; but the lower edge of the sheet would remain within the grooves 11a or $x$, as the case may be. The grooves 11a and $x$ in the bars 11 and $a$ are also deep enough to support, without any fastening, starter strips in an upright position, when said starter strips are placed thereon. These starter strips may be used instead of using foundation sheets reaching from the upper frame bar to the lower frame bar when desired as many consider that the starter strips give a better finish to edible comb honey.

For the better support and alinement of foundation in the frame, I may use the commonly used horizontal wires W stretched between the frame end bars.

Comb honey is preferably cut out of the frame originally supplied with edible foundation by cuts that are sufficiently spaced from the rims of the frame to leave attached thereto comb of a half cell depth or more, so that there will thus remain in the frame a comb starter strip for the bees to subsequently use in comb building when such a frame is again placed in the hive. Such a starter strip may be used by the bees in building comb that serves for edible comb honey, or comb for brood rearing when placed in the brood chamber. Bees will not always build straight comb from such rims, but will do so in my divided frame because the comb area is reduced.

Besides providing a starter strip, as just explained, starter strips consisting of narrow strips of foundation may be applied to the frame bars—such strips being used instead of large sheets of foundation. Supplied with starter strips, the bees will build straight combs, for that is the purpose of starter strips.

As shown in Figs. 1 and 2, a queen excluder 25, of acceptable construction (not necessary to describe) is placed between the super, or surplus honey body 16 and the body below, in order that the queen may not have access to the comb in the super to lay eggs therein. The cover means applied to the top of the super is an outer telescopic cover 26, and an inner flat cover 27 that directly rests on the top of the super body. As shown in Figs. 1 and 2, the hive has a bottom board of customary construction. I make all covers and bottom boards for all the hives alike, so that any cover and bottom board is applicable to any hive in the apiary.

As shown in Fig. 1, all the frames in the super body have the area dividing horizontal bars 12, and in both the food and brood bodies there are such frames and also the usual brood or extractor frames. In Fig. 1, some of the frames are shown provided with foundation of different extent vertically from narrow starter strips 28 to full width sheets 29 that reach from top frame bar 10 to bottom frame bar 11, and partial sheets 30 that reach more or less from the top frame bar downward, or from the dividing bars 12, downward. As shown in Figs. 1 and 2 some of the frames are wired horizontally and others not, no wiring being preferable and if used with the thin edible foundation being used for the purpose of satisfying those who think that fragile foundation should be supported to maintain its central position in the frame during drawing out or comb building by the bees. As shown in Fig. 2 in the bottom brood or food chamber, the foundation has vertical reinforcing wires, and the middle portion of the division bar 12 is broken away to show the foundation that passes through it the division bars here shown being of the type shown in detail in Figs. 4, 5, or 6.

If the super body combs should be filled or partly filled with honey undesirable for table use, such as bitterweed honey, or mixed color honey, or honey in comb travel-stained by the bees, such super body could satisfactorily be used as a brood chamber for a colony, and a fresh start for comb honey production could be made by placing a super above such brood chamber with frames having thin foundation.

Frames having cross bars for comb honey production, when transferred to a brood chamber may be used only temporarily in the brood chamber, should that be the wish of the beekeeper, who by manipulation or working of the hive may finally get them out of the brood chamber.

When the frames for comb honey are in the hive bodies, the top bars only may be seen when the bodies are uncovered. The division bars 12 are not visible. To identify or distinguish such frames from frames not having the division bars, I apply an indicator to the upper side of the top frame bar which will instantly identify it and tell whether the frame is in use for producing edible comb honey or is in use as a brood, food or extracting frame. Such indicator 50 may, as shown in Fig. 3, be simply a nail driven partly in the frame top bar, and bent over to lie against it and rotatable to place such bent portion either crosswise of the top bar to indicate use of the frame for comb honey production or lengthwise of the bar to indicate use of the frame for brood, food or extraction.

What I claim is:

1. A beehive comb frame for interchangeable use in tiered brood and super chambers that are of like form and dimensions, laterally and vertically said frame comprising top, bottom, and end bars, an intermediate horizontal division bar means attached to and extending between the frame end bars and dividing the space between top and bottom bars of the frame into separate comb honey-receiving areas and having a longitudinal slot extending therethrough, through which a comb foundation may extend, the top and bottom bars of the frame having on their under side and upper side, respectively, a longitudinally extending groove, said grooves being adapted, respectively, to receive the upper and lower edges of a sheet of comb foundation that is wider from top to bottom than the distance between said top and bottom bars and less in width than the distance between the bottoms of the said two grooves in said top and bottom bars, the slot in said intermediate division bar means of the frame being substantially aligned with said grooves to allow the foundation sheet to extend therethrough.

2. A bee hive comb frame comprising top, bottom, and end bars, an intermediate horizontal division bar means attached to and extending between the frame end bars and dividing the space between top and bottom bars of the frame into separate comb honey-receiving areas, said intermediate bar means having a longitudinal slot extending through the top and bottom surfaces of the intermediate bar means and through which a comb foundation may extend.

3. A beehive comb frame as set forth in claim 2 wherein the end bars are grooved transversely on their inner faces to provide gains to receive the ends of said intermediate bar means, and means to secure the bars in said gains.

4. A beehive comb frame as set forth in claim 2 wherein the end bars are grooved transversely on their inner faces to provide gains to receive the ends of said intermediate bar means, and wherein said intermediate bar means comprises at least two separate strips in the same horizontal plane, one initially secured in place and the second being inserted in place after the foundation has been put into the frame.

HERSCHEL LEE RUSHING.